United States Patent
Kim et al.

(10) Patent No.: US 10,811,738 B2
(45) Date of Patent: Oct. 20, 2020

(54) BATTERY MODULE, BATTERY PACK COMPRISING BATTERY MODULE, AND VEHICLE COMPRISING BATTERY PACK

(71) Applicant: LG CHEM, LTD., Seoul (KR)

(72) Inventors: Nam-In Kim, Daejeon (KR); Jae-Hyun Seo, Daejeon (KR); Young-Sop Eom, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 202 days.

(21) Appl. No.: 15/570,471

(22) PCT Filed: Jul. 18, 2016

(86) PCT No.: PCT/KR2016/007803
§ 371 (c)(1),
(2) Date: Oct. 30, 2017

(87) PCT Pub. No.: WO2017/052050
PCT Pub. Date: Mar. 30, 2017

(65) Prior Publication Data
US 2018/0175464 A1 Jun. 21, 2018

(30) Foreign Application Priority Data

Sep. 25, 2015 (KR) .......................... 10-2015-0136291

(51) Int. Cl.
*H01M 10/613* (2014.01)
*H01M 10/625* (2014.01)
(Continued)

(52) U.S. Cl.
CPC ....... *H01M 10/613* (2015.04); *H01M 2/1077* (2013.01); *H01M 2/1094* (2013.01);
(Continued)

(58) Field of Classification Search
CPC ........... H01M 10/613; H01M 10/4207; H01M 10/6551; H01M 2/1094; H01M 2/1077;
(Continued)

(56) References Cited

U.S. PATENT DOCUMENTS 6,322,921 B1 * 11/2001 Iwaizono ............ H01M 2/1241
429/56
2007/0219670 A1 * 9/2007 Tanaka ................ H01M 10/482
700/295
(Continued)

FOREIGN PATENT DOCUMENTS

EP      2 763 214 A1    8/2014
JP      2015-111493 A    6/2015
(Continued)

OTHER PUBLICATIONS

Machine translation of WO2013146561, Kawano et al., 2013 (Year: 2013).*

(Continued)

*Primary Examiner* — Maria Laios
*Assistant Examiner* — Kwang Han
(74) *Attorney, Agent, or Firm* — Birch, Stewart, Kolasch & Birch, LLP

(57) ABSTRACT

A battery modules includes a battery cell assembly including at least one battery cell, and at least one cooling fin configured to contact the at least one battery cell and to be exposed on opposite side parts of the battery cell assembly and a side part perpendicular to the opposite side parts, a first end plate including at least one first insulating member mounted contacting the at least one cooling fin exposed on the opposite side parts of the battery cell assembly, and configured to support the opposite side parts of the battery cell assembly, a second end plate coupled to the first end plate, and configured to support the side part of the battery cell (Continued)

assembly, a cooling plate between the second end plate and the battery cell assembly, and at least one second insulating member arranged between the cooling plate and the at least one cooling fin.

15 Claims, 12 Drawing Sheets

(51) Int. Cl.
| | |
|---|---|
| *H01M 10/6554* | (2014.01) |
| *H01M 2/10* | (2006.01) |
| *H01M 10/6555* | (2014.01) |
| *H01M 10/653* | (2014.01) |
| *H01M 10/6551* | (2014.01) |
| *H01M 10/42* | (2006.01) |
| *H01M 10/647* | (2014.01) |

(52) U.S. Cl.
CPC ..... *H01M 10/4207* (2013.01); *H01M 10/625* (2015.04); *H01M 10/653* (2015.04); *H01M 10/6551* (2015.04); *H01M 10/6554* (2015.04); *H01M 10/6555* (2015.04); *H01M 10/647* (2015.04); *H01M 2220/20* (2013.01)

(58) Field of Classification Search
CPC ........... H01M 10/653; H01M 10/6555; H01M 10/6554; H01M 10/625; H01M 2220/20; H01M 10/647
See application file for complete search history.

(56) References Cited

U.S. PATENT DOCUMENTS

| | | | |
|---|---|---|---|
| 2011/0064985 A1* | 3/2011 | Lee | H01M 2/1077 429/120 |
| 2012/0301769 A1 | 11/2012 | Okada et al. | |
| 2013/0004822 A1* | 1/2013 | Hashimoto | H01M 2/1072 429/120 |
| 2014/0011059 A1 | 1/2014 | Hashimoto et al. | |
| 2015/0086818 A1* | 3/2015 | Nishimura | H01M 10/625 429/72 |

FOREIGN PATENT DOCUMENTS

| | | |
|---|---|---|
| KR | 10-2012-0132382 A | 12/2012 |
| KR | 10-2013-0123901 A | 11/2013 |
| KR | 10-2014-0039350 A | 4/2014 |
| KR | 10-2014-0147555 A | 12/2014 |
| WO | WO-2013146561 A1 * 10/2013 | .......... H01M 2/1077 |

OTHER PUBLICATIONS

International Search Report for PCT/KR2016/007803 (PCT/ISA/210) dated Oct. 25, 2016.

* cited by examiner

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2015-0136291 filed on Sep. 25, 2015 in the Republic of Korea, the disclosure of which is incorporated herein by reference.

BACKGROUND ART

Secondary batteries that are easily applicable according to product groups and have electric characteristics such as high energy density, etc. are being commonly applied in electric vehicles (EV) or hybrid electric vehicles (HEV) driven by an electric driving source, as well as portable devices. Secondary batteries have been highlighted as a new energy source that is echo-friendly and improves energy efficiency, due to its advantages that by-products according to usage of energy do not generate at all, in addition to a primary advantage, that is, noticeable reduction in using of fossil fuel.

Secondary batteries that are widely used may include lithium ion batteries, lithium polymer batteries, nickel cadmium batteries, nickel hydrogen batteries, nickel zinc batteries, etc. An operating voltage of a unit secondary battery, that is, a unit battery cell, is about 2.5V to 4.2V. Therefore, in a case where an output voltage greater than above is required, a battery pack may be configured by connecting a plurality of battery cells in series. Also, a battery pack may be configured by connecting a plurality of battery cells in parallel according to charging/discharging capacity required by the battery pack. Therefore, the number of battery cells included in the battery pack may vary depending on a required output voltage or charging/discharging capacity.

In addition, in a case where a battery pack is configured by connecting a plurality of battery cells in series/in parallel, a battery module including a plurality of battery cells is configured first, and the battery pack is generally configured by using a plurality of battery modules and adding other elements.

Here, a battery module generally includes a battery cell assembly that includes a plurality of battery cells and a plurality of cooling fins disposed among the plurality of battery cells in contact with the battery cells, and end plates covering the battery cell assembly.

In such a battery module according to the related art, it is necessary to ensure an insulating resistance in order to prevent happening of accidents, e.g., short-circuits, an electric shock of a user, etc. For example, it is necessary for the battery module itself to ensure an insulating property in order to prevent accidents such as the short-circuit of the battery module or electric shock of the user that may be caused when a high voltage is applied from electric components such as a motor provided on an outer part of the battery module to the battery module, or when a voltage is applied from battery cells to a member having a metal material such as cooling fins in the battery module.

Accordingly, in a battery module according to the related art, an additional anodizing or a painting process for insulation is performed on metal members such as the end plates covering the battery cell assembly, the cooling fin, etc.

However, in a case of performing the anodizing or painting process, damages may easily occur according to scratches and it causes defective insulation. In addition, if the end plates or the metal members have complicated shapes, it may be difficult to perform the anodizing or painting processes.

Therefore, it is necessary to find a method of ensuring module insulation without performing an additional anodizing or painting process in a battery module.

DISCLOSURE

Technical Problem

The present disclosure is designed to solve the problems of the related art, and therefore the present disclosure is directed to providing a battery module capable of ensuring module insulation without performing an additional anodizing or painting process, a battery pack including the battery module, and a vehicle including the battery pack.

Technical Solution

In one aspect of the present disclosure, there is provided a battery module including: a battery cell assembly including at least one battery cell, and at least one cooling fin configured to contact the at least one battery cell to be exposed on opposite side parts of the battery cell assembly and on a side part perpendicular to the opposite side parts; a first end plate including at least one first insulating member mounted on an internal wall of the first end plate to contact the at least one cooling fin exposed on the opposite side parts of the battery cell assembly, and configured to support the opposite side parts of the battery cell assembly; a second end plate coupled to the first end plate to cover the battery cell assembly, and configured to support the side part of the battery cell assembly; a cooling plate arranged between the second end plate and the side part of the battery cell assembly, and configured to receive heat from the at least one cooling fin; and at least one second insulating member arranged between the cooling plate and the at least one cooling fin exposed on the side part of the battery cell assembly.

The at least one second insulating member may overlap with the at least one insulating member between the first end plate and the cooling plate.

The cooling plate may include: a plate body mounted on the second end plate; and a plate edge extending from the plate body towards the opposite side parts of the battery cell assembly, and the at least one second insulating member overlaps the at least one insulating member between the first end plate and the plate edge.

The at least one second insulating member may include: an insulation plate mounted on the plate body, and configured to contact the at least one cooling fin exposed on the side part of the battery cell assembly; and an insulation hook extending from the insulation plate to be inserted to the plate edge, and configured to at least partially contact the at least one first insulating member between the first end plate and the plate edge.

The insulation hook may elastically contact the at least one first insulating member.

The insulation hook may include: a first hook portion extending from the insulation plate, and mounted on an internal wall of the plate edge; a second hook portion extending from the first hook portion to an outer part of the plate edge; and a third hook portion extending from the second hook portion and contacting the at least one first insulating member.

The at least one first insulating member and the third hook portion may compress each other between the first end plate and the plate edge.

The third hook portion may be arranged closer to the internal wall of the second end plate than the at least one first insulating member in a direction perpendicular to the second end plate.

The third hook portion may include: an elastic contact portion extending a predetermined length from the second hook portion; and an elastic protrusion portion protruding a predetermined length from an end part of the elastic contact portion.

The first insulating member may include an insulation sheet and a pair of the first insulating members are provided, the pair of first insulating members respectively contact the at least one cooling fin exposed on the opposite side parts of the battery cell assembly, and the at least one second insulating member overlaps with the pair of first insulating members so as to respectively contact the pair of first insulating members between the first end plate and the cooling plate.

The second insulating member may include one insulation sheet.

The at least one second insulating member may include a polycarbonate material.

In another aspect of the present disclosure, there is also provided a battery pack including: the at least one battery module according to the previous embodiment; and a pack case configured to package the at least one battery module.

In another aspect of the present disclosure, there is also provided a vehicle comprising the battery pack according to the previous embodiment.

Advantageous Effects

According to various embodiments of the present disclosure, a battery module capable of ensuring a module insulation without performing an additional anodizing or painting process, a battery pack including the battery module, and a vehicle including the battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
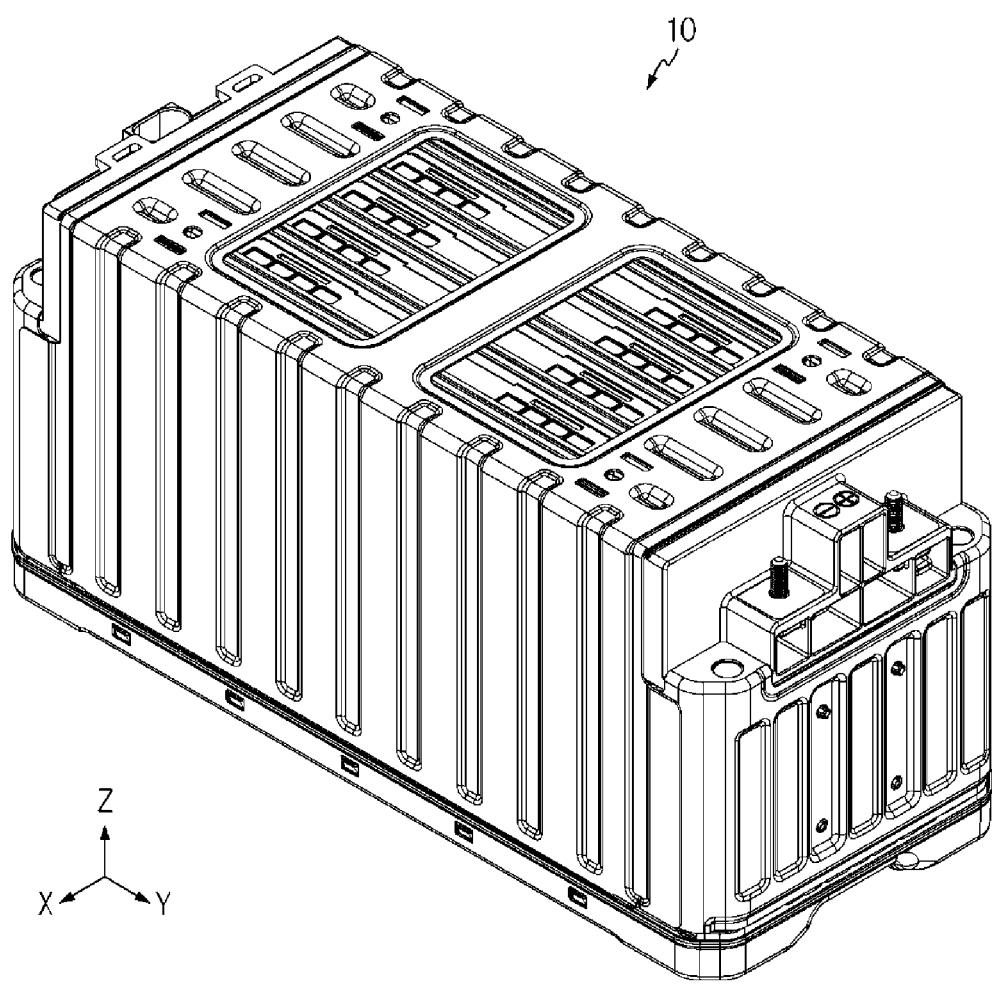
FIG. 1 is a schematic perspective view of a battery module according to an embodiment of the present disclosure.
Figure 2:
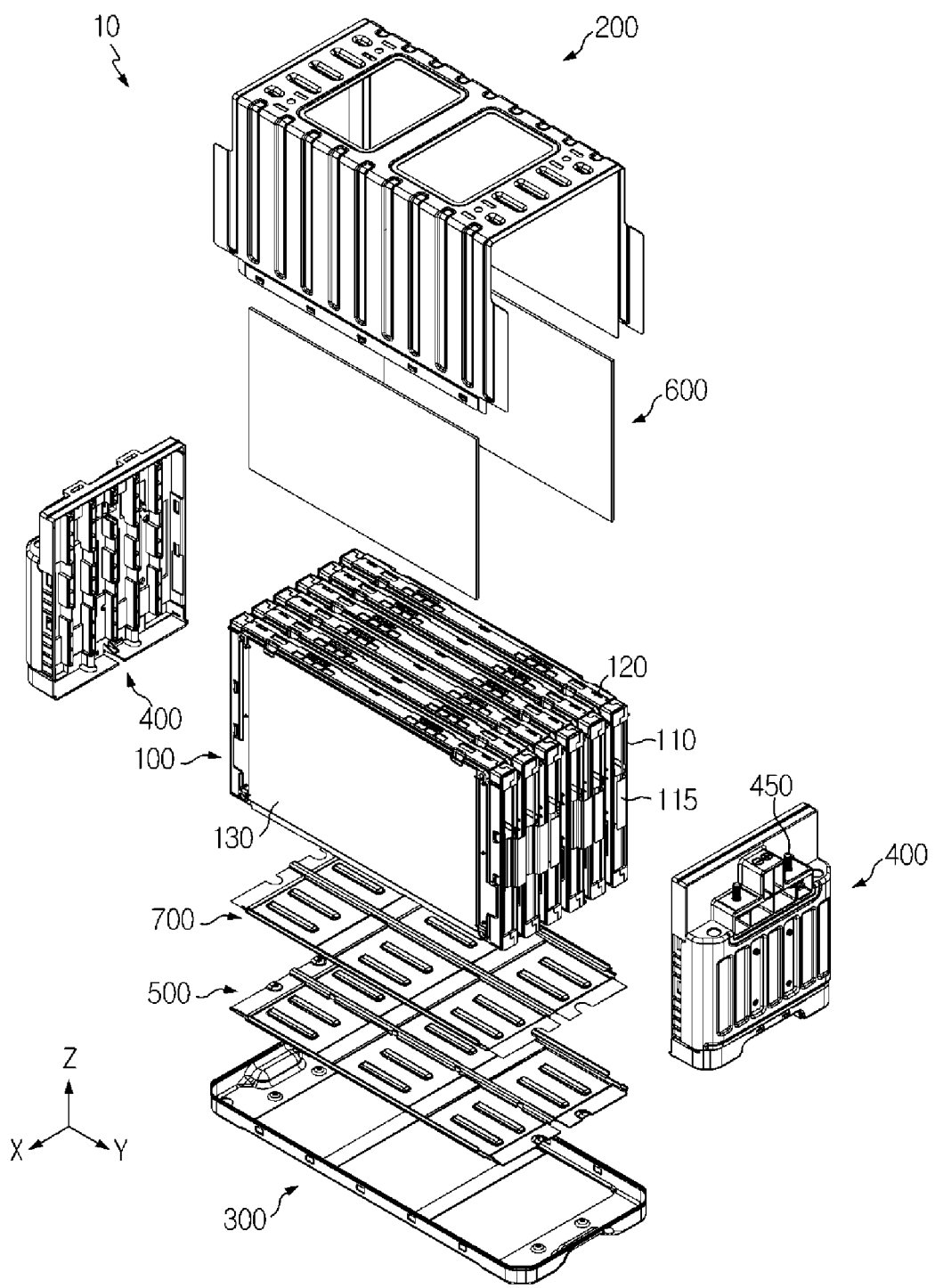
FIG. 2 is a schematically exploded perspective view of the battery module of FIG. 1.
Figure 3:
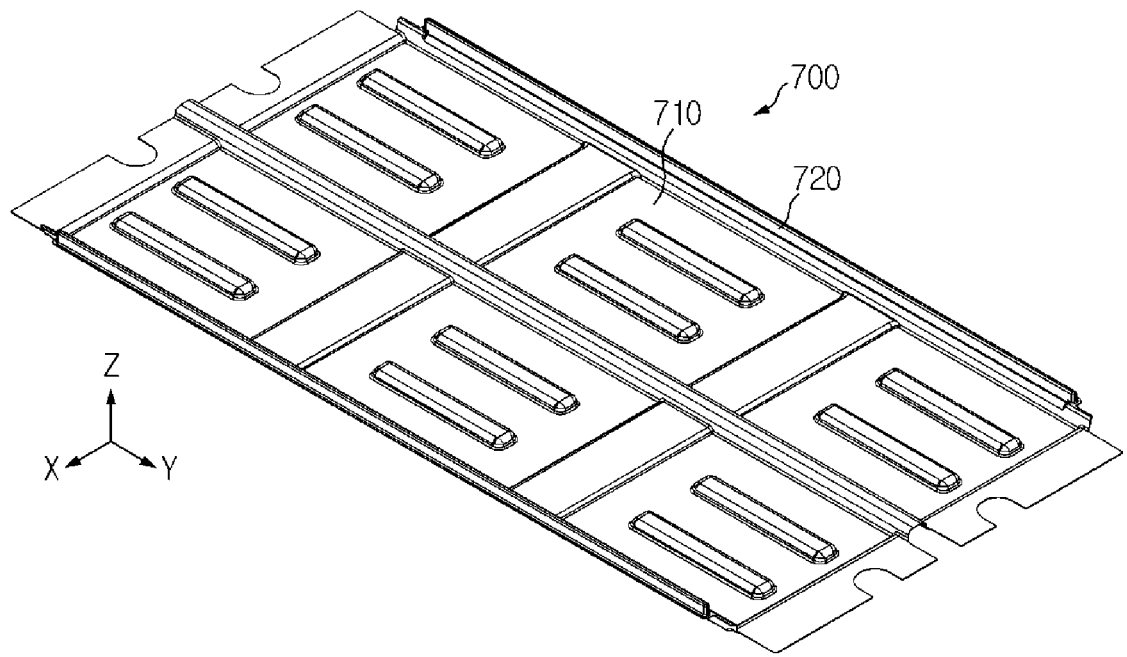
FIG. 3 is a schematic perspective view of a second insulating member of the battery module of FIG. 2.
Figure 4:
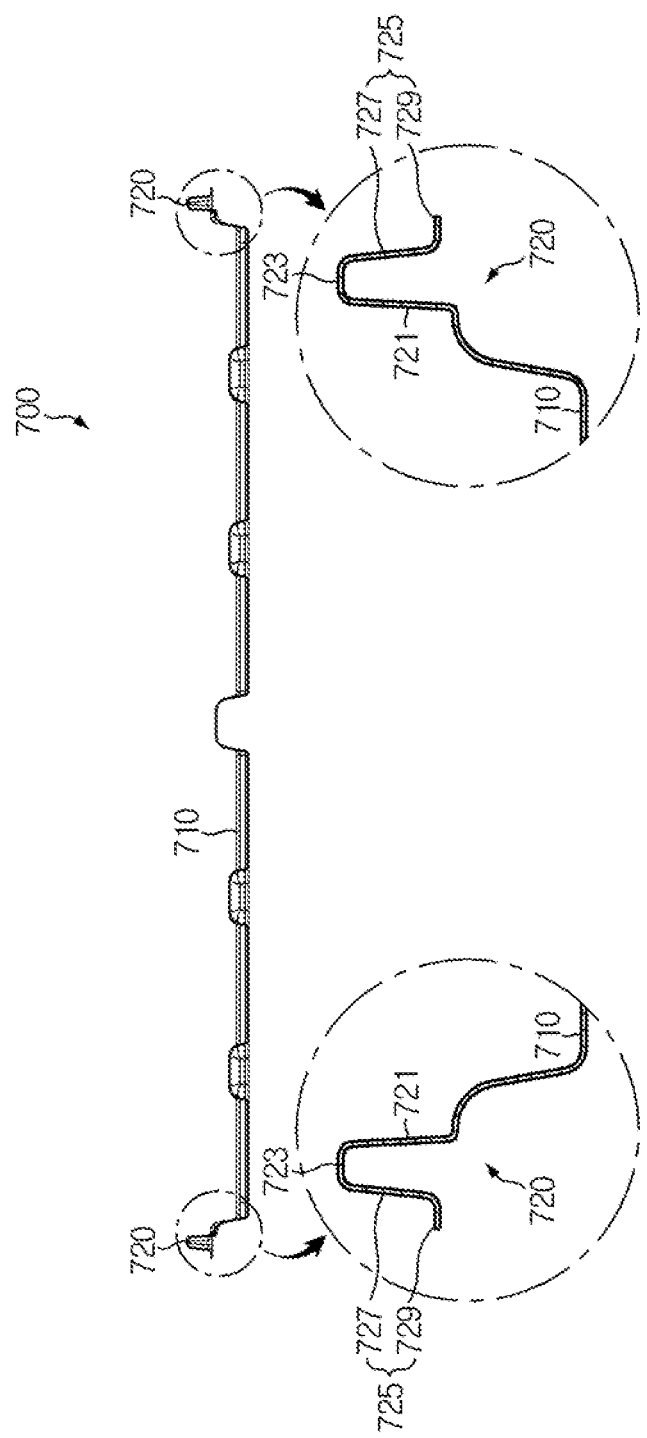
FIG. 4 is a cross-sectional view of the second insulating member of FIG. 3.
Figure 5:
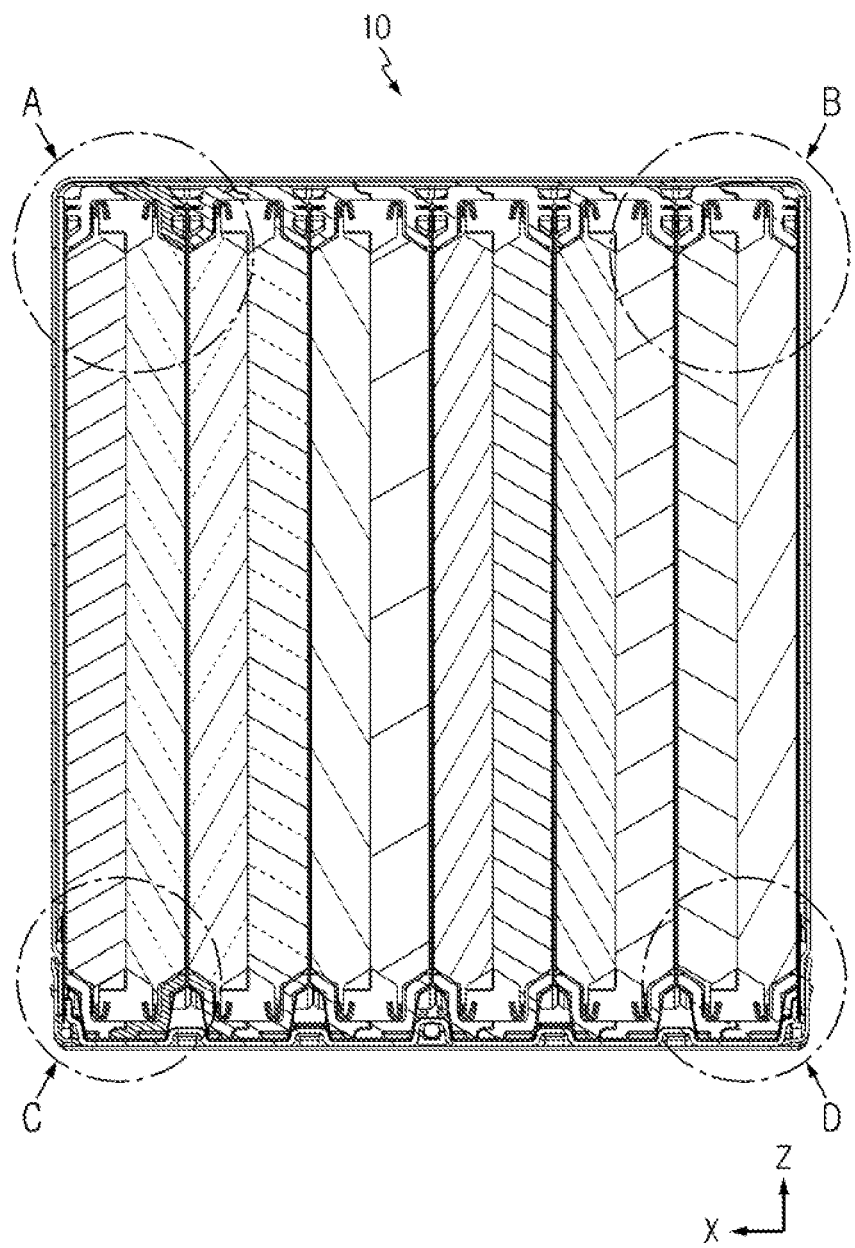
FIG. 5 is a cross-sectional view of the battery module of FIG. 1.
Figure 6:
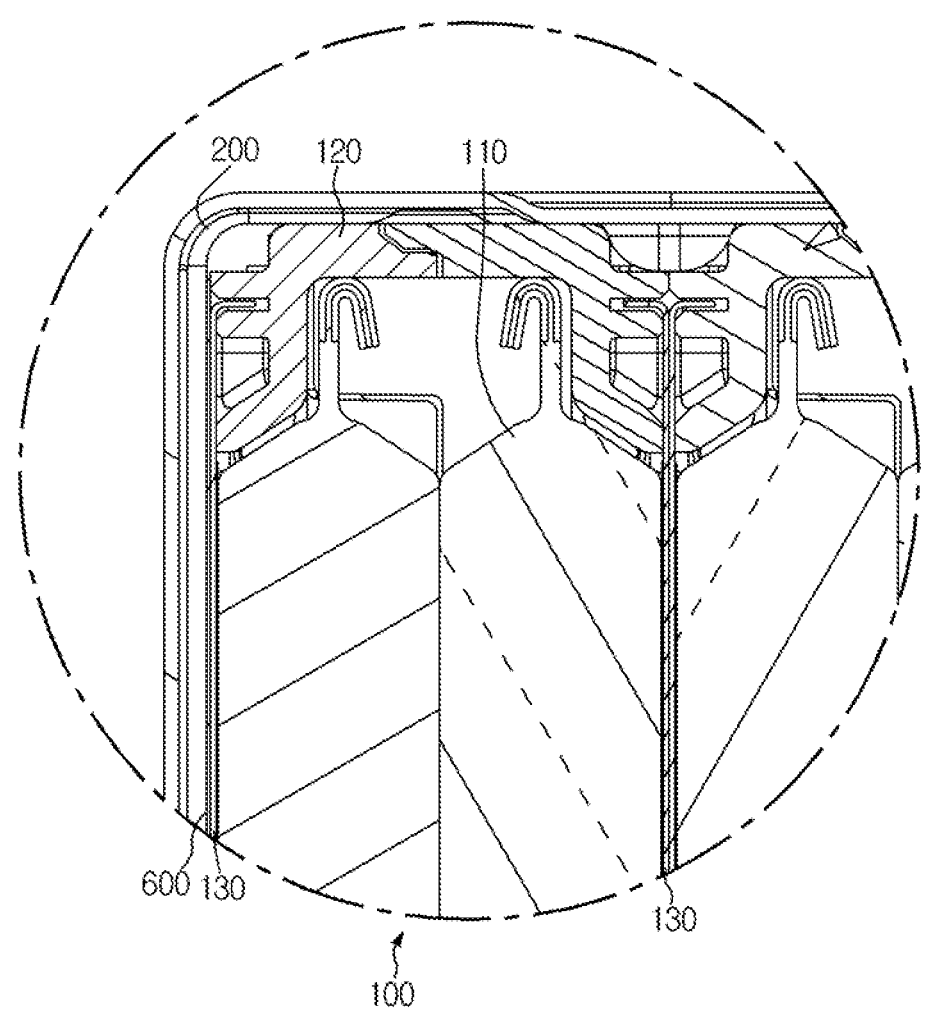
FIG. 6 is an expanded view of a part A in the battery module of FIG. 5.
Figure 7:
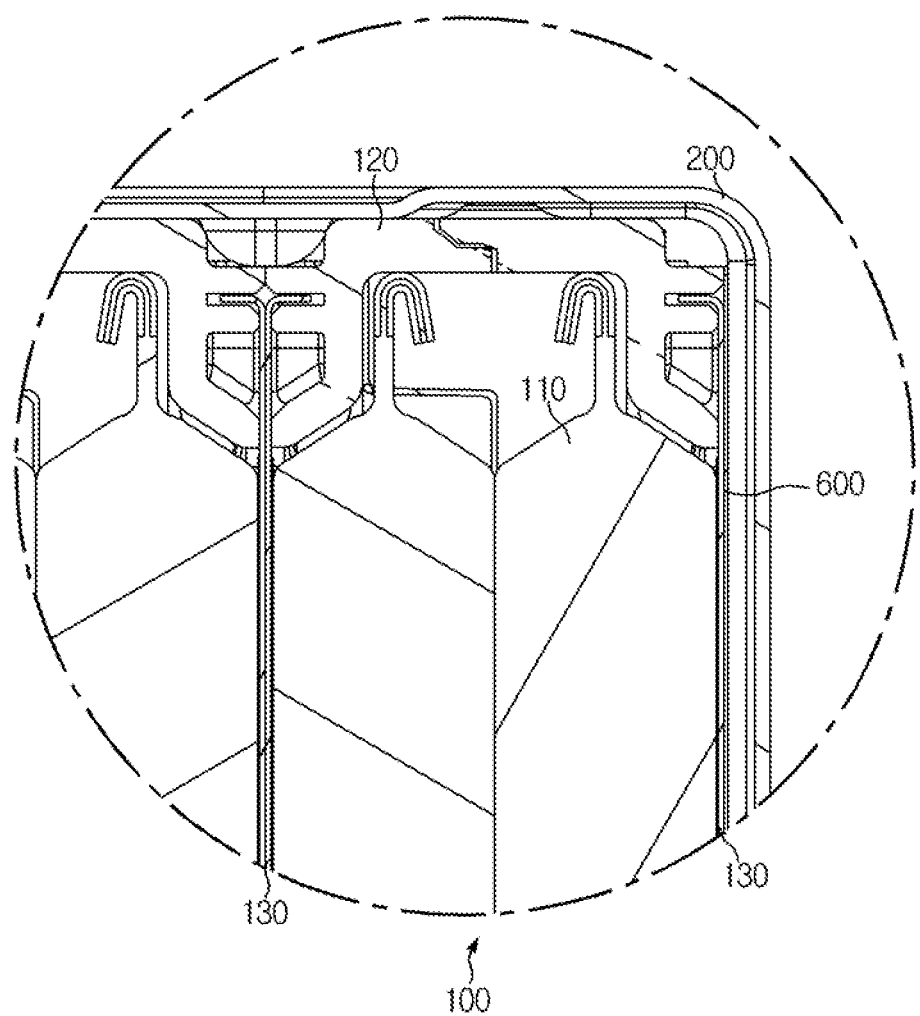
FIG. 7 is an expanded view of a part B in the battery module of FIG. 5.
Figure 8:
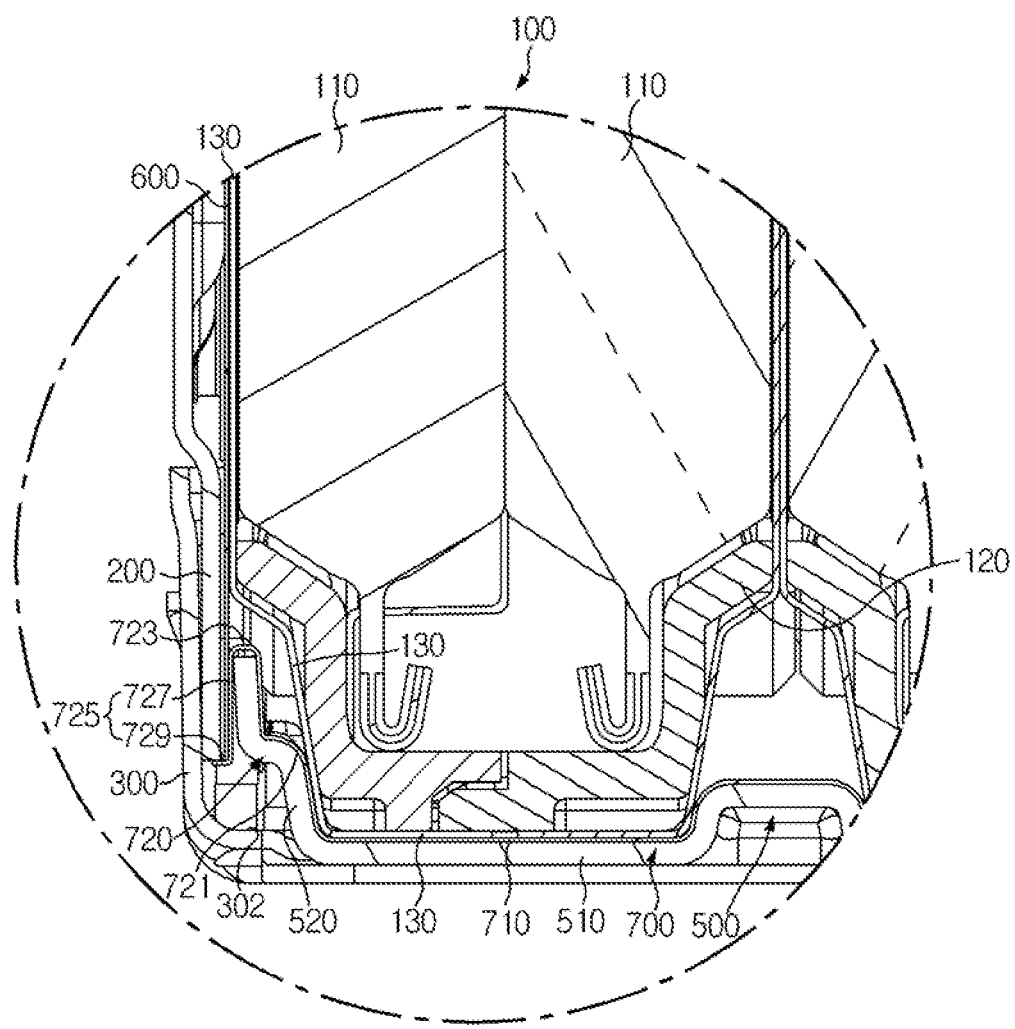
FIG. 8 is an expanded view of a part C in the battery module of FIG. 5.
Figure 9:
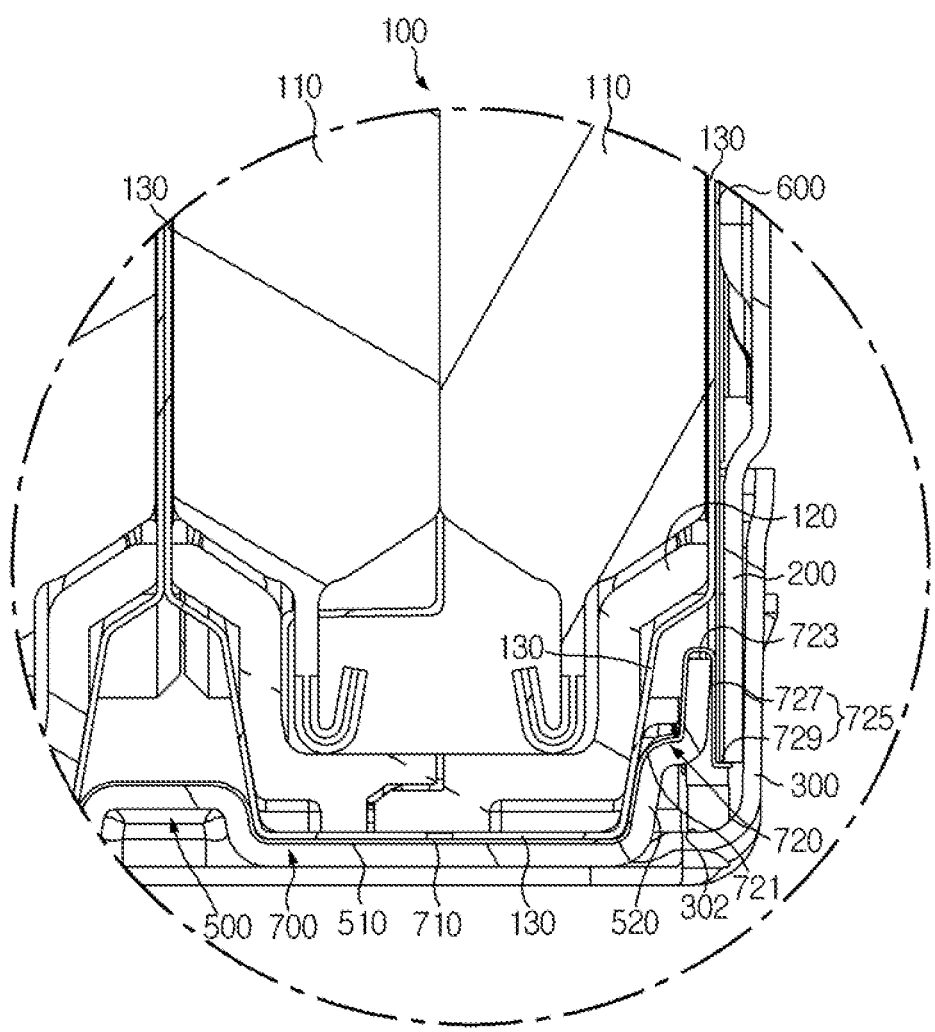
FIG. 9 is an expanded view of a part D in the battery module of FIG. 5.

FIG. 1 is a schematic perspective view of a battery module according to an embodiment of the present disclosure, FIG. 2 is a schematically exploded perspective view of the battery module of FIG. 1, FIG. 3 is a schematic perspective view of a second insulating member in the battery module of FIG. 2. FIG. 4 is a cross-sectional view of the second insulating member of FIG. 3, FIG. 5 is a cross-sectional view of the battery module of FIG. 1, FIG. 6 is an expanded view of a part A in the battery module of FIG. 5, FIG. 7 is an expanded view of a part B in the battery module of FIG. 5. FIG. 8 is an expanded view of a part C in the battery module of FIG. 5, and FIG. 9 is an expanded view of a part D in the battery module of FIG. 5.

Referring to FIGS. 1 to 9, a battery module 10 may include a battery cell assembly 100, a first end plate 200, a second end plate 300, a cover frame 400, a cooling plate 500, a first insulating member 600, and a second insulating member 700.

The battery cell assembly 100 is an assembly of main components in the battery module 10, and may include a battery cell 110, cell cartridges 120, and cooling fins 130. In the battery cell assembly 100, at least one battery cell 110 may be provided, and the cooling fin 130 may contact the battery cell 110. Here, the cooling fin 130 contacting the battery cell 110 may be exposed to opposite side parts of the battery cell assembly 100 in a back-and-forth direction (X-axis direction), and a side part perpendicular to the opposite side part, in more detail, a lower part downward (−Z axis direction).

At least one battery cell may be provided as the battery cell 110, and in the present embodiment, a plurality of battery cells may be provided as the battery cell 110. The battery cells 110 may be mounted in the cell cartridges 120 that will be described later, to be stacked with one another. Here, at least one of the battery cells 110 may be accommodated in one cell cartridge 120.

Each of the battery cells 110 may include an electrode assembly, a battery case, an electrode lead 115, and an insulation tape. The electrode assembly may include a cathode plate, an anode plate, and a separator. The battery case is provided to package the electrode assembly, and may include a laminate sheet including a resin layer and a metal layer. The electrode lead 115 is electrically connected to the electrode assembly, and may protrude out of the battery case. A pair of electrode leads 115 may be provided, and the pair of the electrode leads 115 may include a cathode lead and an anode lead. The number of the insulation tapes may correspond to the number of the electrode leads, and the insulation tapes may prevent occurring of short-circuit between the battery case and the electrode leads 115 and may enhance a sealing property of the battery case.

The cell cartridges 120 may hold at least one of the battery cells 110 to prevent the battery cells from shaking, and are stacked with one another to guide assembling of the battery cells 110. A plurality of the cell cartridges 120 may be provided to guide the stacking of the plurality of battery cells 110, and may be stacked with one another.

At least one battery cell 110 may be mounted in the plurality of cell cartridges 120. In detail, at least one battery cell 110 may be inserted in each of the plurality of cell cartridges 120, so that the cell cartridge 120 may accommodate the at least one battery cell 110.

The cooling fins 130 may include a thermally conductive material such as aluminum, and a plurality of cooling fins 130 may be provided and mounted respectively in the cell cartridges 120 to exchange heat with the battery cells 110.

Here, the cooling fin 130 mounted in the cell cartridge 120 arranged at a front part (+X direction) of the battery cell assembly 100 is exposed from the front part (+X direction) of the battery cell assembly 100, and the cooling fin 130 mounted in the cell cartridge 120 that is arranged at a rear part (−X direction) of the battery cell assembly 100 may be exposed from the rear part (−X direction) of the battery cell assembly 100. In addition, the plurality of cooling fins 130 may be respectively mounted in the plurality of cell cartridges 120 so as to be exposed from the lower part (−Z direction) of the battery cell assembly 100.

The first end plate 200 supports the battery cell assembly 100, and may cover opposite side parts of the battery cell assembly 100 in the back-and-forth direction (X-axis direction) and an upper part (+Z direction) of the battery cell assembly 100.

The second end plate 300 supports the battery cell assembly 100 with the first end plate 200, in particular, supports the lower part (−Z direction) of the battery cell assembly 100, and is coupled to the first end plate 200 to cover the battery cell assembly 100.

The cover frame 400 supports the battery cell assembly 100 with the first end plate 200 and the second end plate 300, and a pair of cover frames 400 are provided to cover the battery cell assembly 100 at opposite sides (in Y-axis direction) of the plurality of battery cells 110, where the electrode leads 115 are arranged, in the battery cell assembly 100.

Each of the cover frames 400 may include a pair of terminals 450.

The pair of terminals 450 may be electrically connected to the electrode leads 115 of the plurality of battery cells 110, and are exposed to an outer part of the battery module 100 to be electrically connected to an external power supply, etc.

The cooling plate 500 may include a thermally conductive material such as aluminum like the cooling fins 130, and is arranged between the lower part of the battery cell assembly 100 and the second end plate 300 to absorb heat transferred from the plurality of cooling fins 130.

The cooling plate 500 may include a plate body 510 and a plate edge 520.

The plate body 510 is mounted on the second end plate 300 and may cover the lower part of the battery cell assembly 100. The plate edge 520 may extend from the plate body 510 towards the opposite side parts of the battery cell assembly 100 in the back-and-forth direction (X-axis direction).

The first insulating member 600 is provided to ensure module insulation of the battery module 100, and may be formed as a thin plate shape. A pair of the first insulating members 600 may be provided, and may be mounted on internal walls of the first end plate 200 in the back-and-forth direction (X-axis direction) to contact the cooling fins 130 exposed from the opposite side parts of the battery cell assembly 100 in the back-and-forth direction (X-axis direction). In addition, since an upper internal wall (in +Z direction) of the first end plate 200 does not directly face a metal structure such as the cooling fins 130, an additional insulating member may not be provided.

The first insulating member 600 may block the voltage that may be applied from an external part of the first end plate 200 to the plurality of battery cells 110 in the battery module 100. In addition, the first insulating member 600 may block the voltage that may be applied from the cooling fins 130 to prevent unexpected current leakage to the outer part of the battery module 100.

The second insulating member 700 ensures the module insulation of the battery module 100 with the first insulating member 600, and may be arranged between the cooling plate 500 and the cooling fins 130 exposed on the lower part (−Z direction) of the battery cell assembly 100.

At least one second insulating member 700 may be provided, and in the present embodiment, it is assumed that the second insulating member 700 may include one insulating sheet. In addition, the second insulating member 700 may include a polycarbonate material having high thermal conductivity. Accordingly, the second insulating member 700 may effectively transfer the heat from the cooling fins 130 to the cooling plate 500, with the module insulation.

The second insulating member 700 may block the voltage that may be applied from an external part of the second end plate 300 to the plurality of battery cells 110 in the battery module 100. In addition, the second insulating member 700 may block the voltage that may be applied from the cooling fins 130 to prevent unexpected current leakage to the outer part of the battery module 100.

Accordingly, an insulation between the part where the metal structure such as the cooling fins 130 is provided in the battery module 10 and the first and second end plates 200 and 300 forming an exterior of the battery module 10 may be effectively achieved by using the second insulating member 700 and the first insulating members 600 according to the present embodiment. Therefore, the insulation of the battery module 10 may be effectively achieved without performing an additional anodizing or painting process on the cooling fins 130, the first end plate 200, the second end plate 300, and the cooling plate 500, according to the present embodiment.

In addition, the second insulating member 700 may overlap with the pair of first insulating members 600 between the first end plate 200 and the cooling plate 500. In detail, the second insulating member 700 may overlap with the pair of first insulating member 600 between the first end plate 200 and the plate edge 520 of the cooling plate 500.

Accordingly, in the present embodiment, all of the exposed parts of the cooling fins 130 from the battery cell assembly 100 may be completely surrounded by the first insulating members 600 and the second insulating member 700, and thus, the module insulation of the battery module 100 may be achieved completely.

Hereinafter, the second insulating member 700 will be described below in more detail.

The second insulating member 700 may include an insulation plate 710 and an insulation hook 720.

The insulation plate 710 is mounted on the plate body 510 of the cooling plate 500, and may contact the cooling fins 130 exposed from the lower part of the battery cell assembly 100 (−Z direction).

The insulation hook 720 may extend from each of opposite ends of the insulation plate 701 to be hooked by the plate edge 520 of the cooling plate 500, and may at least partially contact the pair of first insulating members 600 respectively between the first end plate 200 and the plate edge 520 to overlap with the first insulating members 600. Here, the insulation hook 720 may elastically contact each of the pair of first insulating members 600.

The insulation hook 720 may include a first hook portion 721, a second hook portion 723, and a third hook portion 725.

The first hook portions 721 may extend from opposite ends of the insulation plate 710, and may be mounted on an internal wall of the plate edge 520 of the cooling plate 500.

The second hook portions 723 may extend from the first hook portions 721 to outer parts of the plate edge 520 of the cooling plate 500 towards the first insulating members 600.

The third hook portions 725 may extend downwards from the second hook portions 723 towards the second end plate 300 (−Z direction), and may be arranged closer to the internal wall 302 of the second end plate 300 than the pair of the first insulating members 600 in a direction perpendicular to the second end plate 300 (Z-axis direction).

In addition, the third hook portions 725 may elastically contact the pair of first insulating members 600, respectively. Accordingly, the third hook portion 725 and each of the first insulating members 600 may be compressed towards each other between the first end plate 200 and the plate edge 520 of the cooling plate 500.

The third hook portion 725 may include an elastic contact portion 727 and an elastic protrusion portion 729.

The elastic contact portion 727 may extend a predetermined length downward (−Z direction) from the second hook portion 723. Here, the elastic contact portion 727 may extend at least to the end part of each of the first insulating members 600.

The elastic protrusion portion 729 may protrude a predetermined length perpendicularly from an end part of the elastic contact portion 727. The elastic protrusion portion 729 may support the end part of the first insulating member 600 when elastically contacting the first insulating member 600, in order to stably contact the first insulating member 600.

Hereinafter, when the first end plate 200 and the second end plate 300 of the battery module 10 are coupled to each other, arrangement of the first insulating members 600 and the second insulating member 700 will be described in more detail.

Figure 10:
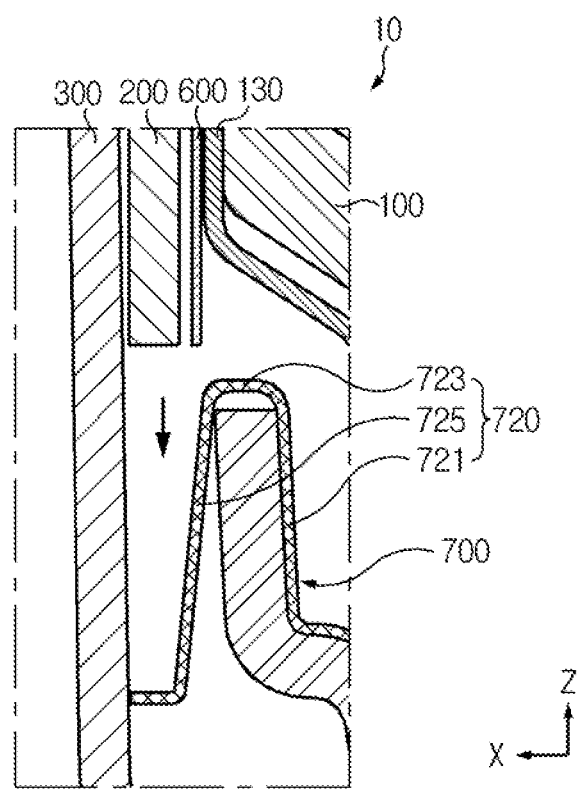
FIGS. 10 and 11 are diagrams illustrating arrangement of a first insulating member and a second insulating member when a first end plate and a second end plate in the battery module of FIG. 2 are coupled to each other.
Figure 11:
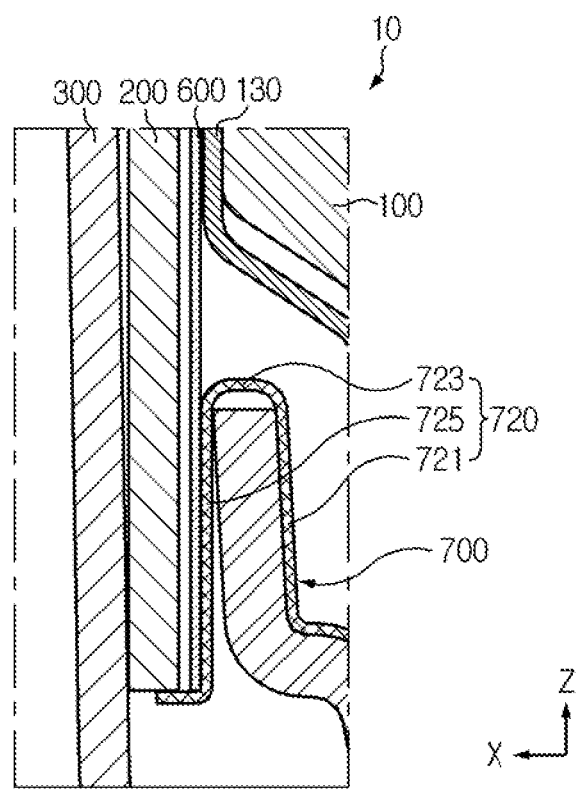

FIGS. 10 and 11 are diagrams illustrating arrangement of a first insulating member and a second insulating member when a first end plate and a second end plate in the battery module of FIG. 2 are coupled to each other.

Referring to FIGS. 10 and 11, when the first end plate 200 and the second end plate 300 of the battery module 10 are coupled to each other in order to cover the battery cell assembly 100, an operator, etc. may further move the first end plate 200 downward (−Z direction) in a state where the first end plate 200 is inserted in the second end plate 300. Accordingly, the pair of first insulating members 600 mounted on the internal wall of the first end plate 200 are also moved downward (−Z direction).

After that, each of the pair of first insulating members 600 elastically contacts the insulation hook 720 of the second insulating member 700 between the first end plate 200 and the plate edge 520 of the cooling plate 500, while pushing the insulation hook 720 of the second insulating member 700.

Accordingly, the insulation hook 720 of the second insulating member 700 is elastically deformed according to the compression of the first insulating members 600 and then pushed towards the plate edge 520 of the cooling plate 500, and then, the insulation hook 720 may overlap the first insulating members 600 while contacting the first insulating members 600 between the first end plate 200 and the plate edge 520 of the cooling plate 500.

As described above, in the battery module 10 according to the present embodiment, the pair of first insulating members 600 and the second insulating member 700 may overlap with each other when the first end plate 200 and the second end plate 300 are coupled to each other, without an additional coupling member or without performing an additional process for overlapping.

As described above, the battery module 10 according to the present embodiment may achieve the module insulation via the first and second insulating members 600 and 700, without performing an additional anodizing or painting process for the insulation of the battery module 10.

Therefore, according to the battery module 10 of the present embodiment, the short-circuit of the battery module 10, an electric shock accident of a user or an operator, etc. may be prevented in advance, and thus, safety of the battery module 10 may be greatly improved.

Figure 12:
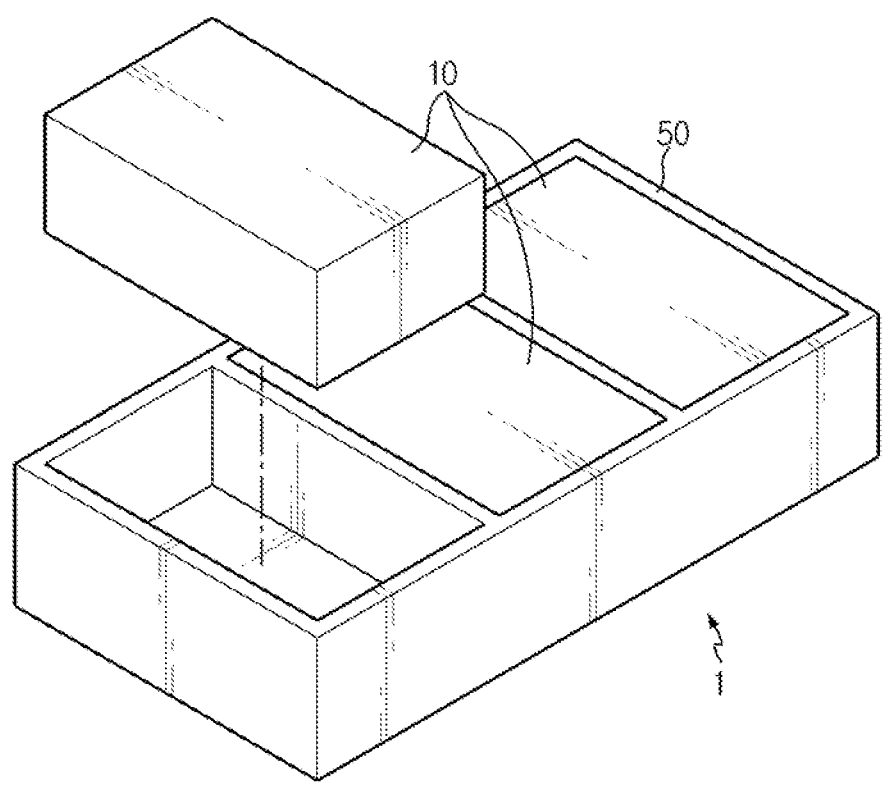
FIG. 12 is a diagram of a battery pack according to an embodiment of the present disclosure.

FIG. 12 is a diagram of a battery pack according to an embodiment of the present disclosure.

Referring to FIG. 12, a battery pack 1 may include at least one battery module 10 and a pack case 50 for packaging the at least one battery module 10.

The battery pack 1 may be included in a vehicle a driving source of the vehicle. As an example, the battery pack 1 may be included in an electric vehicle, a hybrid electric vehicle, and other vehicles capable of using the battery pack 1 as a driving source. Also, the battery pack 1 may be included in other devices, mechanisms, and equipment such as an energy storage system using a secondary battery, as well as the above vehicles.

As described above, the battery pack 1 according to the present embodiment and devices, mechanisms, and equipment including the battery pack 1, e.g., the vehicle, include the battery module 10 described above, and thus, the battery pack 1 and the vehicle having the advantages of the battery module 10 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A battery module comprising:
a battery cell assembly comprising:
at least one battery cell, having a pair of opposed sides;
at least one cooling fin configured to contact one of the sides of the at least one battery cell;

a top plate having a top wall and at least one side wall extending downwardly from the top wall;

at least one first insulating member mounted on the at least one side wall of the top plate to contact the at least one cooling fin, the at least one first insulating member being between the at least one cooling fin and the at least one side wall of the top plate;

a bottom plate under the battery cell assembly and coupled to the top plate to cover the battery cell assembly;

a cooling plate arranged between the bottom plate and the battery cell assembly, and configured to receive heat from the at least one cooling fin, the cooling plate comprising a plate body and a plate edge extending upwardly from the plate body; and at least one second insulating member arranged between the cooling plate and the battery cell assembly, the at least one second insulating member directly contacting the at least one cooling fin, wherein the at least one first insulating member extends on an outer side of the plate edge and the cooling fin extends on an inner side of the plate edge.

2. The battery module of claim 1, wherein the at least one second insulating member overlaps with the at least one first insulating member between the top plate and the outer side of the cooling plate.

3. The battery module of claim 2, wherein the at least one second insulating member overlaps the at least one insulating member between the top plate and the plate edge.

4. The battery module of claim 3, wherein the at least one second insulating member comprises:

an insulation plate mounted on the plate body, and configured to contact the at least one cooling fin exposed on the side part of the battery cell assembly; and an insulation hook extending from the insulation plate to be inserted over the plate edge, and configured to at least partially contact the at least one first insulating member between the top plate and the plate edge.

5. The battery module of claim 4, wherein the insulation hook elastically contacts the at least one first insulating member on the outer side of the plate edge.

6. The battery module of claim 5, wherein the insulation hook comprises:

a first hook portion extending from the insulation plate, and mounted on an internal surface of the plate edge;

a second hook portion extending from the first hook portion to an outer part of the plate edge; and a third hook portion extending from the second hook portion and contacting the at least one first insulating member.

7. The battery module of claim 6, wherein the at least one first insulating member and the third hook portion compress each other between the top plate and the outer side of the plate edge.

8. The battery module of claim 6, wherein the third hook portion is arranged closer to the internal surface of the bottom plate than the at least one first insulating member in a direction perpendicular to the bottom plate.

9. The battery module of claim 6, wherein the third hook portion comprises:

an elastic contact portion extending a predetermined length from the second hook portion; and an elastic protrusion portion protruding a predetermined length from an end part of the elastic contact portion.

10. The battery module of claim 2, wherein the first insulating member comprises an insulation sheet and a pair of the first insulating members are provided, the pair of first insulating members respectively contact the at least one cooling fin exposed on the opposite side parts of the battery cell assembly, and the at least one second insulating member overlaps with the pair of first insulating members so as to respectively contact the pair of first insulating members between the top plate and the cooling plate.

11. The battery module of claim 10, wherein the second insulating member comprises one insulation sheet.

12. The battery module of claim 1, wherein the at least one second insulating member comprises a polycarbonate material.

13. A battery pack comprising:

the at least one battery module according to claim 1; and a pack case configured to package the at least one battery module.

14. A vehicle comprising the battery pack according to claim 13.

15. The battery module of claim 1, wherein the bottom plate has an upwardly extending flange, the upwardly extending flange extending above the cooling plate and joined to the at least one side wall of the top plate.

* * * * *